(12) United States Patent
Krishnamurthy

(10) Patent No.: US 12,228,473 B2
(45) Date of Patent: Feb. 18, 2025

(54) TIRE TREAD DEPTH ESTIMATION SYSTEM AND METHOD

(71) Applicant: NISSAN NORTH AMERICA, INC., Franklin, TN (US)

(72) Inventor: Vikram Krishnamurthy, Marietta, GA (US)

(73) Assignee: Nissan North America, Inc., Franklin, TN (US)

( * ) Notice: Subject to any disclaimer, the term of this patent is extended or adjusted under 35 U.S.C. 154(b) by 100 days.

(21) Appl. No.: 18/072,442

(22) Filed: Nov. 30, 2022

(65) Prior Publication Data

US 2024/0175784 A1     May 30, 2024

(51) Int. Cl.
| | |
|---|---|
| *G01M 17/02* | (2006.01) |
| *G01B 11/22* | (2006.01) |
| *G01B 11/25* | (2006.01) |
| *G06T 7/00* | (2017.01) |
| *G06T 7/40* | (2017.01) |

(52) U.S. Cl.
CPC .......... *G01M 17/027* (2013.01); *G01B 11/22* (2013.01); *G01B 11/2518* (2013.01); *G06T 7/0004* (2013.01); *G06T 7/40* (2013.01)

(58) Field of Classification Search
CPC ................ G01M 17/027; G01B 11/22; G01B 11/2518; G06T 7/0004; G06T 7/40
See application file for complete search history.

(56) References Cited

U.S. PATENT DOCUMENTS

| | | | |
|---|---|---|---|
| 10,311,835 B1 | 6/2019 | Dorrance et al. | |
| 10,760,898 B2 | 9/2020 | Nobis et al. | |
| 2013/0169813 A1* | 7/2013 | Schaefer | ................ G01B 11/22 |
| | | | 348/148 |
| 2023/0341296 A1* | 10/2023 | Stangler | ................ G01B 11/22 |

FOREIGN PATENT DOCUMENTS

| | | | | |
|---|---|---|---|---|
| DE | 102022121709 A1 * | 2/2024 | ............. | G01B 11/22 |
| WO | WO-2021231381 A1 * | 11/2021 | ............. | B60C 11/04 |

* cited by examiner

*Primary Examiner* — Nasim N Nirjhar
(74) *Attorney, Agent, or Firm* — Global IP Counselors, LLP

(57) ABSTRACT

A tire tread depth estimation system for a vehicle includes a light source, a camera, an electronic controller, and a display. The light source is configured to emit light onto a surface of a vehicle tire. The camera is configured to capture an image of the surface of the vehicle tire. The electronic controller is connected to the light source and to the camera. The controller is configured to estimate a depth of a tire tread of the vehicle tire based on the image received from the camera. The display is configured to display the estimated tire tread depth.

17 Claims, 9 Drawing Sheets

TIRE TREAD DEPTH ESTIMATION SYSTEM AND METHOD

BACKGROUND

Technical Field

The present disclosure generally relates to a tire tread depth estimation system and method. More specifically, the present disclosure relates to a tire tread depth estimation system and method using optical information of a tire surface.

Background Information

Tire tread depth is a vertical measurement between an outer surface, or the tread rubber, of the tire to a bottom of a tire tread groove formed in the outer surface of the tire. As a vehicle is driven, the tread wears down. When the depth of the tire tread is equal to or below a predetermined depth, which is typically $2/32$ inches (1.5875 mm), the tire is determined to be worn out and replacement is recommended. Replacement of a tire is often suggested at a tire tread depth above the predetermined depth. Tires with a small tire tread depth are more susceptible to punctures, as well as providing less traction with the road and braking less responsively.

A vehicle tire typically has several tread grooves. The depth of each tread groove is measured to ensure even wear of the tire. Physically measuring the depth of each tire tread groove is a difficult and cumbersome process.

SUMMARY

In view of the state of the known technology, one aspect of the present disclosure is to provide a tire tread depth estimation system for a vehicle including a light source, a camera, an electronic controller, and a display. The light source is configured to emit light onto a surface of a vehicle tire. The camera is configured to capture an image of the surface of the vehicle tire. The electronic controller is connected to the light source and to the camera. The controller is configured to estimate a depth of a tire tread of the vehicle tire based on the image received from the camera. The display is configured to display the estimated tire tread depth.

Another aspect of the present disclosure is to provide a method of estimating a tire tread depth. A surface of a vehicle tire is illuminated with a light source. An image of the illuminated surface of the vehicle tire is captured with a camera. The captured image is transmitted to an electronic controller. A depth of a tire tread of the vehicle tire is estimated based on the captured image. The estimated tire tread depth of the vehicle tire is displayed on a display.

Also other objects, features, aspects and advantages of the disclosed tire tread depth estimation system and method will become apparent to those skilled in the art from the following detailed description, which, taken in conjunction with the annexed drawings, discloses exemplary embodiments of the tire tread depth estimation system and method.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
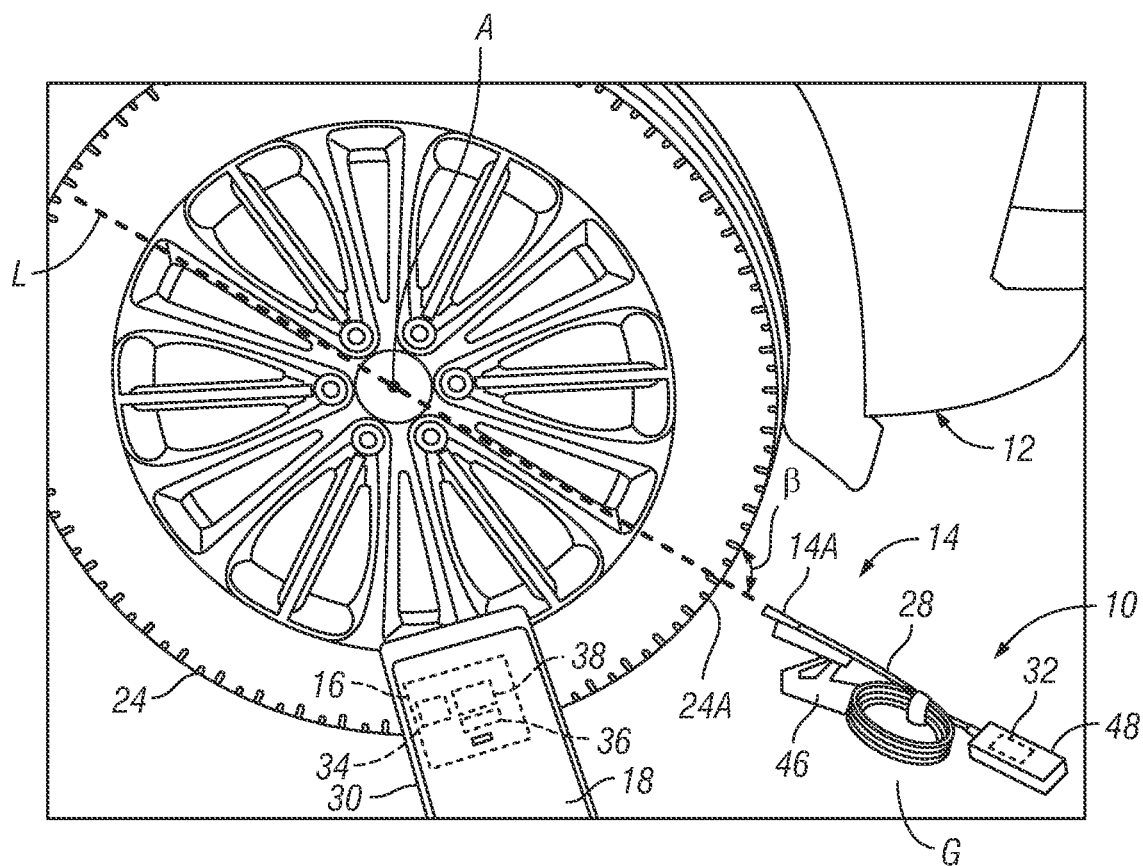
FIG. 1 is a side elevational view of a tire tread depth estimation system measuring a tire tread depth in accordance with an exemplary embodiment.
Figure 5:
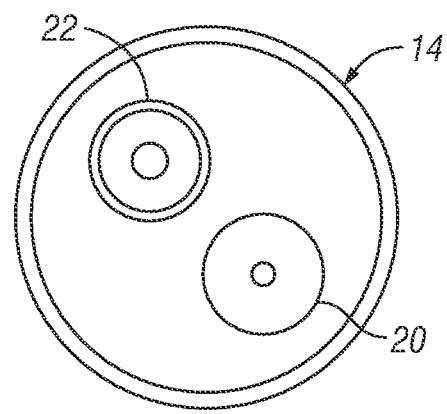
FIG. 5 is an elevational view of an optical device of the tire tread depth estimation system.

Referring initially to FIG. 1, a tire tread depth estimation system 10 for a vehicle 12 includes an optical inspection device 14, an electronic controller 16, and a display 18. The optical inspection device 14 includes a light source 20 and a camera 22, as shown in FIG. 5.

Figure 3:
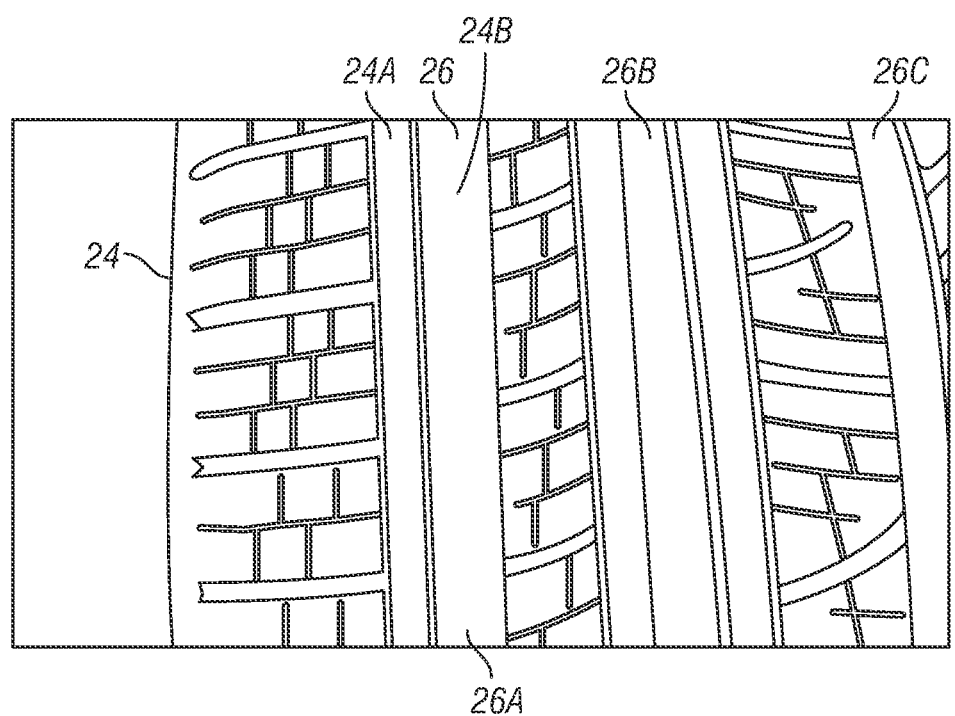
FIG. 3 is an elevational view of a vehicle tire.
Figure 4:
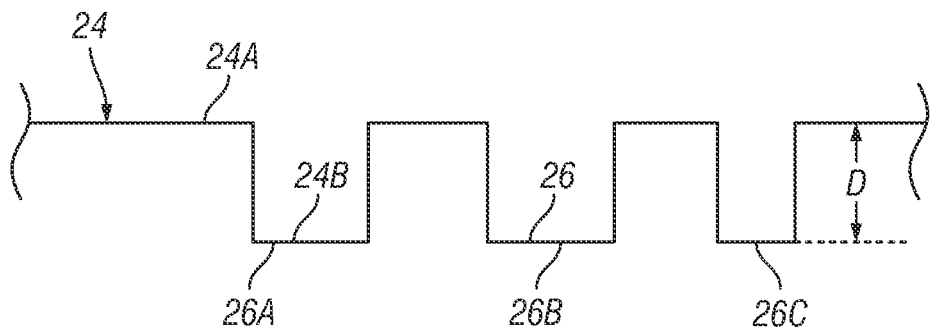
FIG. 4 is an elevational view in cross section of the vehicle tire of FIG. 3.

The vehicle 12 includes a plurality of tires 24. Each tire 24 includes at least one tire tread groove 26, as shown in FIGS. 3 and 4. The tire 24 in FIGS. 3 and 4 is illustrated having three tire tread grooves 26A, 26B and 26C, although the tire 24 can have any suitable number of tire tread grooves 26. The tire tread depth D is measured from the outer surface 24A of the tire 24 at the tire tread to a bottom surface 24B of the tire in the tire tread groove 26 in a direction substantially perpendicular to a rotation axis A (FIG. 1) of the tire 24. A new tire typically has a tire tread depth D of approximately $10/32$ inches (0.3125 inches, 7.9375 mm) or $11/32$ inches (0.34375 inches, 8.73125 mm). A tire tread depth D of $2/32$ inches (0.0625 inches, 1.5875 mm) is conventionally determined to be a worn-out tire that should be replaced. A tire tread depth D of $6/32$ inches (0.1875 inches, 1.5875 mm) is typically considered to be a good tire tread depth. A tire tread depth D of $4/32$ inches (0.125 inches, 3.175 mm) and less is a tire tread depth at which replacement of the tire is suggested. As the tire tread depth D lessens, the performance of the tire 24 decreases.

Conventionally, a tire tread depth gauge is inserted into each tire tread groove 26 to measure the tire tread depth D. Alternatively, a coin, such as a penny or a quarter, is inserted in the tread groove 26 to estimate the tire tread depth D. These methods are cumbersome, and prone to inaccuracies.

A tire tread depth estimation system 10 in accordance with an exemplary embodiment estimates the tire tread depth D using an optical inspection device 14, such as a conventional endoscope or borescope. The tire tread depth estimation system 10 is non-invasive and does not require the tire 24 to be removed from the vehicle 12 or to lift the vehicle 12 off the ground. The tire tread depth estimation system 10 uses an optical approach to estimate a tire tread depth D of a tread groove 26 of a tire 24 using an image captured of the outer surface 24A of the tire 24. The tired tread depth estimation system 10 provides an accurate technique for estimating the tire tread depth D of each tread groove 26 of the tire 24. Upon estimating that the tire tread depth D is 4/32 inches (3.175 mm) or less, the lifespan of the tire 24 can be determined to be ending and replacement of the tire recommended. Replacement of the tire 24 can be recommended at any tire tread depth D in which performance of the tire is deemed compromised.

As shown in FIG. 1, the tire tread depth estimation system 10 includes the optical inspection device 14 and the electronic controller 16. The tire tread depth estimation system 10 further includes a display 18 in electronic communication with the electronic controller 16. The electronic controller 16 is programmed to control the display 18 to display the estimated tire tread depth D, and a recommendation regarding replacement of the tire 24. For example, when the estimated tire tread depth D is below a predetermined depth for tire replacement, such as 4/32 inches or less, a recommendation to replace the tire is presented on the display 18. Additionally, a coupon can be presented with the information when the tire is deemed to require replacement or replacement is suggested in the near future.

The optical inspection device 14 is configured to obtain dimensional information from an image of the outer surface, or the tire tread, 24A of the tire 24, as shown in FIG. 1. The optical inspection device 14 includes a camera 22 configured to capture the image of the outer surface 24A of the tire 24. The optical inspection device 14 further includes a light source 20 configured to emit light onto the outer surface 24A of the vehicle tire 24. The electronic controller 16 is connected to the light source 20 and to the camera 22. The electronic controller 16 is configured to estimate the depth D of the tire tread 24A based on the image received from the camera 22. The display 18 is configured to display the image capture by the camera 22, and to display the estimated tire tread depth D.

As shown, the optical inspection device 14 is preferably a conventional wireless borescope or endoscope having the light source 20 and the camera 22, as shown in FIGS. 1 and 5. The optical inspection device 14 includes a housing 28 in which the light source 20 and the camera 22 are disposed. The housing 28 can be a flexible tube, as shown in FIG. 1. The optical inspection device 14 is in wireless communication with the electronic controller 16 that estimates the tire tread depth D of the tire 24.

In the illustrated embodiment, the electronic controller 16 is part of a mobile device 30 that is in wireless communication with the optical inspection device 14, as shown in FIG. 1. The mobile device 30 is provided to be used with the optical inspection device 14. Examples of the mobile device 30 include a smartphone, a tablet or a personal computer. The optical inspection device 14 is equipped with a wireless communicator 32 and the electronic controller 16 is equipped with a corresponding wireless communicator 34. The wireless communicator 32 of the optical inspection device 14 and the wireless communicator 34 of the mobile device 30 are preferably disposed on a respective printed circuit board PCB that is disposed in the mobile device 30 and the optical inspection device 14. The wireless communicators 32 and 34 can be equipped with Bluetooth technology, including Bluetooth low energy, Wi-Fi, or include the wireless protocol ANT+.

The term "wireless communicator" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any other type of signal suitable for wireless communications as understood in the vehicle field. Here, the wireless communication communicator can be a two-way wireless communication unit having a receiver and a transmitter.

Preferably, the mobile device 30 includes at least one software application that is installed to detect, measure, store and/or send information regarding the tire tread depth D of the tire 24. Therefore, the electronic controller 16 is in electronic communication with the optical inspection device 14 to receive the image of the surface 24A of the tire 24. That is, the optical inspection device 14 can upload image data to the mobile device 30 to be processed by the electronic controller 16 in the mobile device 30. The electronic controller 16 is programmed to determine the tire tread depth D of the tire 24 based on the image captured by the optical inspection device 14.

The electronic controller 16 is configured to process the images captured and transmitted by the optical inspection device 14. The electronic controller 16 includes a processor 36 for processing data captured by the optical inspection device 14. For example, the images captured by the optical inspection device 14 can be processed to generate images by video codec(s), and/or the processor 36, and/or graphics hardware, and/or a dedicated image processing unit incorporated within the circuitry of the camera 22. The mobile device 30 preferably includes memory or storage 38 for storing programs and processes. The images captured by the optical inspection device 14 can be stored in the memory and/or the storage 38 of the mobile device 30. The memory and/or storage 38 can include one or more different types of media used by processor 36, graphics hardware, and image capture circuitry to perform device functions. For example, the memory may include memory cache, ROM, and/or RAM.

The storage 38 of the mobile device 30 can be any non-transitory computer readable medium, such as a ROM device, a RAM device, a hard disk, a flash drive, cloud drive, etc. The storage 38 is configured to store settings, programs, data, calculations and/or results of the processor(s) 36. The electronic controller 16 can include a program or an application that controls the optical inspection device 14 to capture the image of the surface 24A of the tire 24.

In the illustrated embodiment, the electronic controller 16 can be provided with the mobile device 30. The electronic controller 16 can alternatively be provided as part of an external server or a remote server. For example, the processing and computing operations described for the electronic controller 16 herein can alternatively be performed on a cloud. That is, the programs and applications for estimating the tire tread depth can be stored on the cloud, which the mobile device 30 can be connected to. The electronic controller 16 can therefore be a central processing unit of the cloud so that the estimation of the tire tread depth is performed on the cloud. For simplicity, the electronic controller 16 will be hereafter described as being part of the mobile device 30. It will be apparent to those skilled in the vehicle field from this disclosure that the electronic controller 16 can be disposed in any suitable location.

Figure 6A:
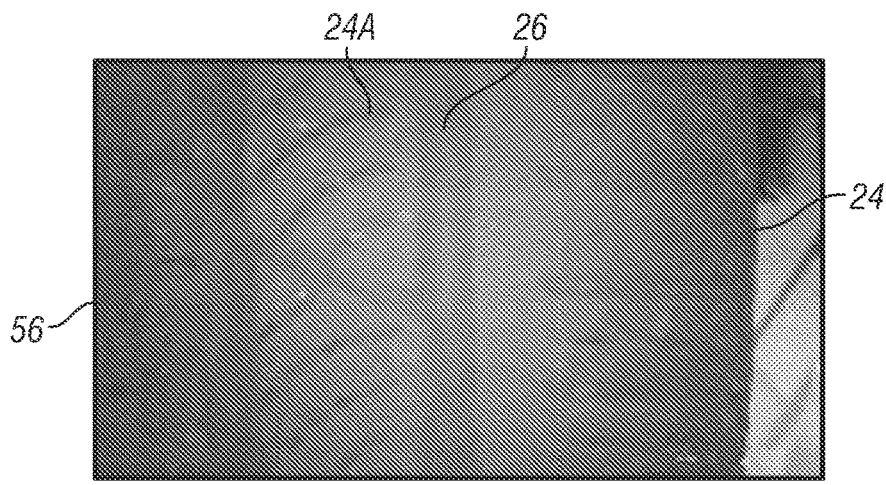
FIGS. 6A-6C are an elevational view of a tire, a corresponding gray scale image of the tire, and a corresponding image intensity of the tire for a tire tread depth of 4.71 mm.
Figure 6B:
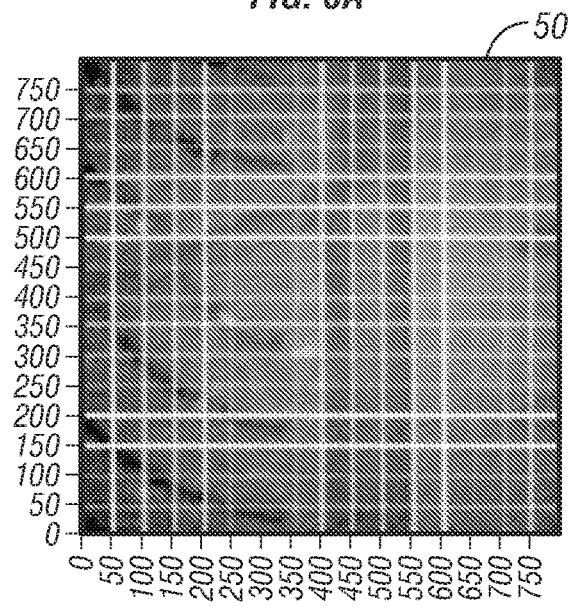
Figure 6C:
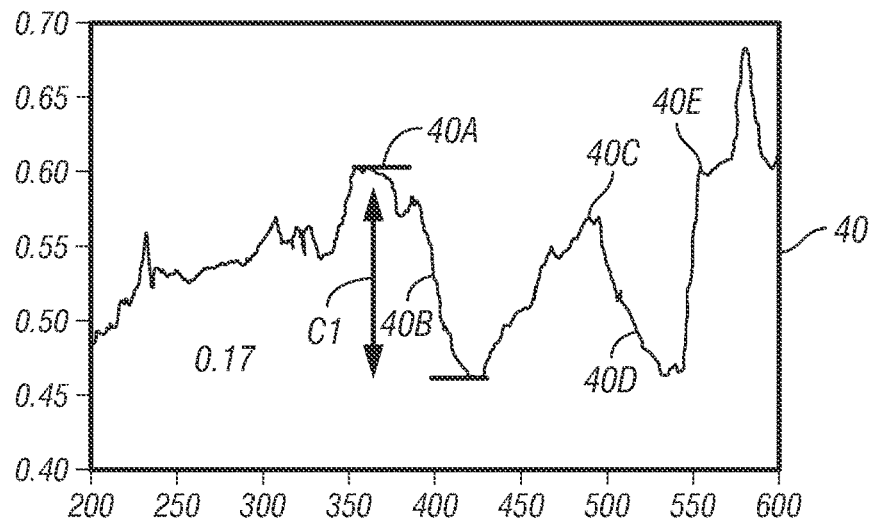

In the illustrated embodiment, the storage 38 is configured to store at least one reference image associated with a tire tread depth D of a tire 24. More particularly, the storage 38 is configured to store a plurality of reference images associated with tire tread depths. For example, the storage 38 can store images of tires of varying tire tread depths that can be used as reference for comparison to the detected values obtained by the optical inspection device 14. Therefore, the mobile device 30 includes pre-stored reference tire tread depths that can be used to determine the tire tread depth D of the tire 24. The storage 38 can store an image library having a plurality of reference tire images for comparing to the captured image of the surface 24A of the tire 24. As shown in FIGS. 6C, 7C and 8C, image intensity graphs 40, 42 and 44 are generated by the processor 36 based on the captured image of the surface 24A of the tire 24. The generated image light intensity graph 40, 42 and 44 is compared to a sample dataset of prestored image light intensity graphs stored in the storage 38 for which the tire tread depth is known. The generated image light intensity graph 40, 42 and 44 can be compared to the stored dataset of image intensity graphs to determine the tire tread depth D of the tire 24 based on the image captured and transmitted by the optical inspection device 14.

The storage 38 can also store non-transitory computer readable media (e.g., audio, image and video files), computer program instructions or software, preference information, device profile information, and any other suitable data. The storage 38 preferably further contains convolutional neural networks (CNN) or other types of image recognition/processing software. The memory and/or the storage 38 can be used to retain computer program instructions or code organized into one or more modules and written in any desired computer programming language. The processor 36 of the electronic controller 16 can execute such computer program code by implementing one or more of the methods described herein.

As shown in FIG. 1, the mobile device 30 further includes an electronic display 18 that can display information regarding the reference images that are prestored in the storage 38, and/or live images captured by the optical inspection device 14. The electronic display 18 can further display other information accessible by the processor 36 of the electronic controller 16. The electronic display 18 is preferably a touchscreen that is an assembly of both an input ('touch panel') and output ('display') device. The touch panel is normally layered on the top of an electronic visual display of an information processing system. The electronic display 18 can be a liquid-crystal display (LCD), active-matrix organic light-emitting diode (AMOLED) display, an organic light-emitting (OLED) display, or any other suitable display.

The user can provide input or control the information processing system through multi-touch gestures by touching the display screen with a special stylus or one or more fingers. The user can use the touchscreen to react to what is displayed and, if the software allows, to control how it is displayed; for example, zooming to increase the text size. As stated, the electronic controller 16 is programmed to control the electronic display 18 to display an indication of the estimated tire tread depth. The indication can include text such as "the tire needs replacement" or "the tire will need replacement soon."

The processor 36 of the electronic controller 16 can be any suitable programmable control device capable of executing instructions necessary to carry out or control the operation of the many functions performed by the mobile device 30 (e.g., such as the processing of images captured by the optical inspection device 14 and/or infrared imaging or ultrasound). The processor 36 can, for instance, control the electronic display 18 and receive user input from user interface which can take a variety of forms, such as a button, keypad, dial, a click wheel, keyboard, display screen and/or a touch screen. The processor 36 can be a system-on-chip such as those found in mobile devices and include a dedicated graphics processing unit (GPU).

The processor 36 can be based on reduced instruction-set computer (RISC) or complex instruction-set computer (CISC) architectures or any other suitable architecture and may include one or more processing cores. The mobile device 30 is preferably further equipped with graphics hardware, such as special purpose computational hardware for processing graphics, and/or an assisting processor to process graphics information. The graphics hardware can include one or more programmable graphics processing units (GPUs).

Figure 2:
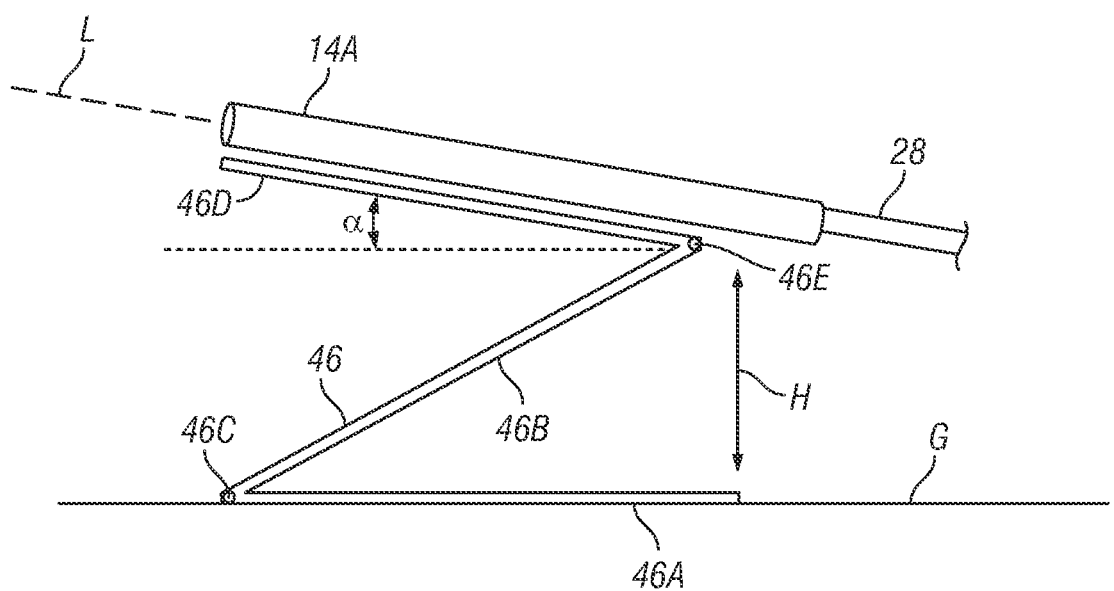
FIG. 2 is a side elevational view of an adjustable stand of the tire tread depth estimation system of FIG. 1.

As shown in FIGS. 1 and 2, the tire tread depth estimation system 10 further includes an adjustable stand 46 that can be used for estimating the tire tread depth D. In particular, the adjustable stand 46 can be used to help position the optical inspection device 14 to capture the image of the surface 24A of the tire 24 for measurement. As shown, the adjustable stand 46 is movable along the ground G to position the optical inspection device 14 with respect to the tire 24. The adjustable stand 46 facilitates positioning the optical inspection device 14 such that a longitudinal axis L of the optical inspection device 14 passes through the rotational axis A of the tire 24, as shown in FIG. 1. In particular, the user preferably positions the optical inspection device 14 such that the longitudinal axis is substantially perpendicular to the surface 24A of the tire 24. The user preferably positions the housing 28 at an imaging end 14A of the optical inspection device 14 at an approximately ninety degree angle relative to the surface 24A of the tire 24 to be imaged.

The adjustable stand 46 includes a base 46A that is substantially planar and is configured to rest on the ground G, as shown in FIG. 2. A first leg 46B is pivotally connected to the base 46A and is pivotable about a first connection point 46C relative to the base 46A. A second leg 46D is pivotally connected to the first leg 46B and is pivotable about a second connection point 46E relative to the first leg 46B. The housing 28 at the imaging end 14A of the optical inspection device 14 is removably connected to the second leg 46D in any suitable manner, such as with clips, hook and loop fasteners, or any other suitable fastening means. The first and second legs 46B and 46D are adjustable such that the height H of the housing 28 at the imaging end 14A relative to the ground G is controllable. The first and second legs 46B and 46D are also adjustable such that an angle α of the housing 28 at the imaging end 14A relative to the ground G is controllable. The adjustable stand 46 facilitates positioning the housing 28 at the imaging end 14A of the optical inspection device 14 relative to the surface of the tire 24 such that the longitudinal axis L at the imaging end 14A is substantially perpendicular to the surface 24A of the tire 24 being imaged. In other words, the adjustable stand 46 facilitates controlling an angle β between the longitudinal axis L and the surface 24A of the tire 24 to be substantially ninety degrees.

Figure 10:
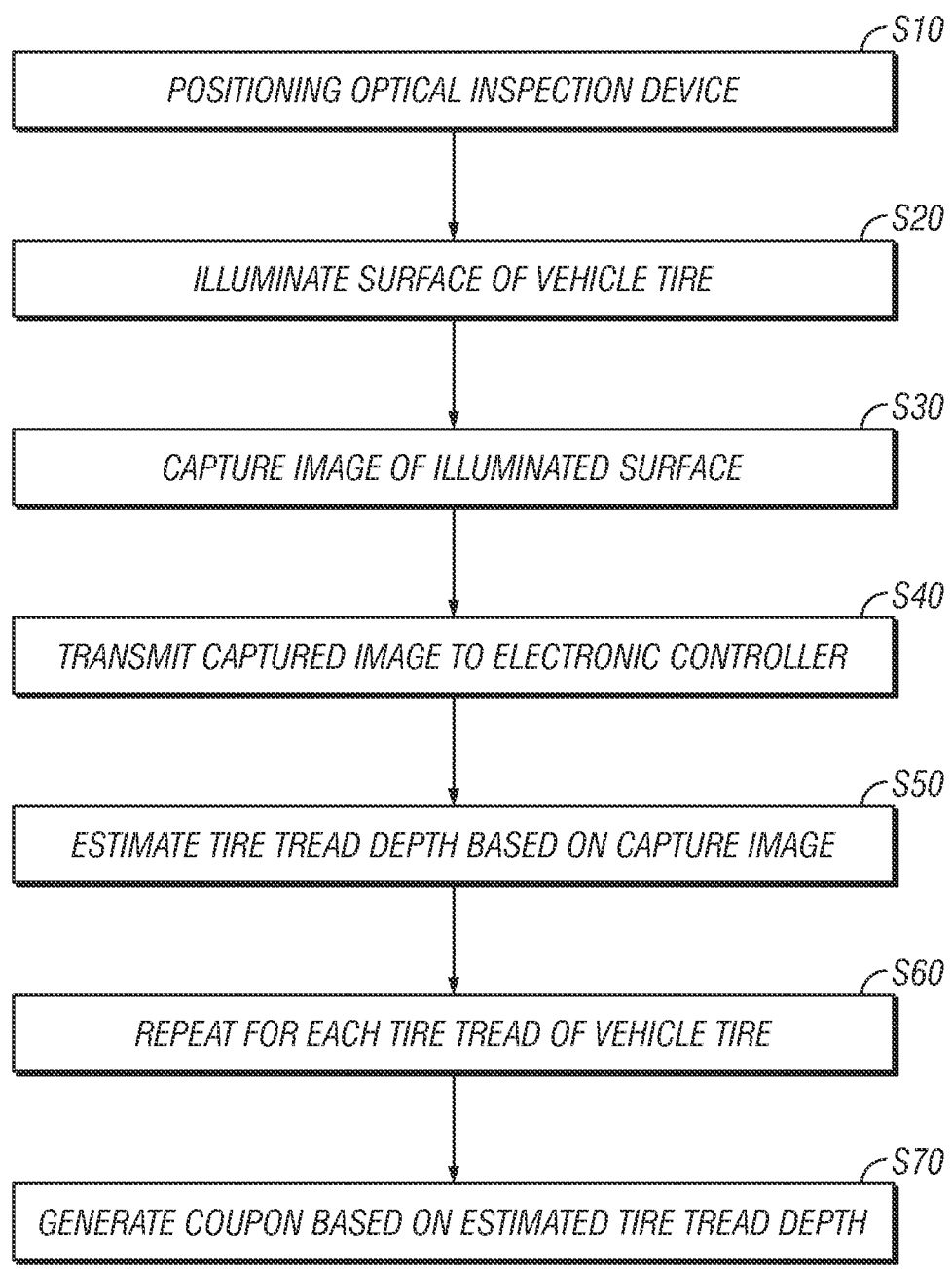
FIG. 10 is a flowchart of a method of estimating a tire tread depth of the vehicle of FIG. 1.

A method for estimating a tire tread depth D of a tire 24 is shown in FIG. 10. In step S10, the optical inspection device 14 is positioned relative to the tire 24 for which the tire tread depth D is to be estimated. The adjustable stand 46 is positioned such that the longitudinal axis L of the housing 28 at the imaging end 14A is substantially perpendicular to the surface 24A of the tire 24. The imaging end 14A is preferably aligned with the tire tread groove 26 at which the tire tread depth D is to be estimated. In other words, the longitudinal axis L is preferably centered in the tread groove 26 being imaged. As shown in FIG. 3, the imaging end 14A is aligned with the tread groove 26A when the tire tread depth at tread groove 26A is being estimated.

In step S20, the surface 24A of the tire is illuminated with the light source 20. An operating member 48 is connected to the optical inspection device 10, as shown in FIG. 1. The operating member 48 can include a button or control that turns the optical inspection device on and off, thereby controlling light emitted by the light source 20. The image captured by the camera 22 is transmitted to the display 18 such that the user can see the surface 24A of the tire 24. The operating member 48 further includes controls to adjust the focus of the camera 22, such that a clear image of the tire surface 24A is transmitted. The electronic controller 16 can be used to control a frequency of the light emitted by the light source 20. A different light frequency has a different wavelength, such that the light is reflected differently by the tire 24. Different light frequencies provide better results in different environments, such that the user can select a light frequency suitable for the current environment in which the tire 24 is to be imaged.

In step S30, an image of the illuminated surface 24A of the tire 24 is captured. The operating member 48 further includes another button or control that causes the camera 22 to capture an image of the surface 24A of the tire 24. The captured image is transmitted from the wireless communicator 32 of the optical inspection device 10 to the wireless communicator 34 of the electronic controller 16 of the mobile device 30 in step S40.

In step S50, the electronic controller 16 estimates the tire tread depth D based on the captured image transmitted by the optical inspection device 10. Any suitable method of determining the tire tread depth D from the transmitted image can be used. In one method, a surface of the tire 24 is illuminated and the captured image 56 (FIG. 6A) is transmitted to the electronic controller 16. The processor 36 generates a gray scale image 50, as shown in FIG. 6B, from the transmitted captured image 56 (FIG. 6A). The darker portions of the gray scale image 50 correspond to less reflected light, and the lighter portions of the gray scale image 50 correspond to more reflected light. A light intensity graph 40, as shown in FIG. 6C, is generated by the processor 36 based on the gray scale image 50 of FIG. 6B. A substantially W-shaped portion of the light intensity graph 40 corresponds to the tire tread groove 26 in the captured image 56 (FIG. 6A). The first leg 40B of the light intensity graph extends downwardly from a peak 40A because less light is reflected from the upper surface 24A of the tire on the left side of the tire tread groove 26. The peak 40A reflects the outer surface 24A of the tire to the left of the groove 26. The decrease in light intensity indicated by the leg 40B is caused by less light reflected at the inner edge of the groove 26. As the distance in the groove 26 changes from the left edge to the center of the groove 26, more light is reflected from the bottom of the groove 26, causing a peak 40C in the light intensity graph 40. The light intensity graph 40 extends downwardly from the peak 40C approaching the right edge of the groove 26, as reflected by leg 40D. The surface 24A of the tire 24 on the right side of the groove, again increases to another peak 40E on the surface 24A of the tire 24 outside the groove 26. The change C1 in light intensity is a change in the light density at the peak 40A to the light density at the bottom of the leg 40B. The amount of change C1 in the light density can be compared to stored light intensity images to estimate the tire tread depth. Based on the change C1 indicated in FIG. 6C, the tire tread depth D is estimated to be 4.71 mm (0.1854 inches).

Figure 7A:
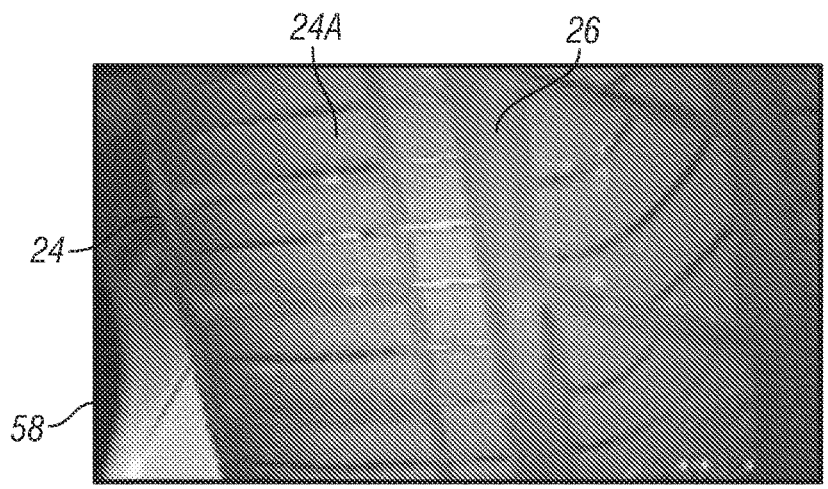
FIGS. 7A-7C are an elevational view of a tire, a corresponding gray scale image of the tire, and a corresponding image intensity of the tire for a tire tread depth of 6.82 mm.
Figure 7B:
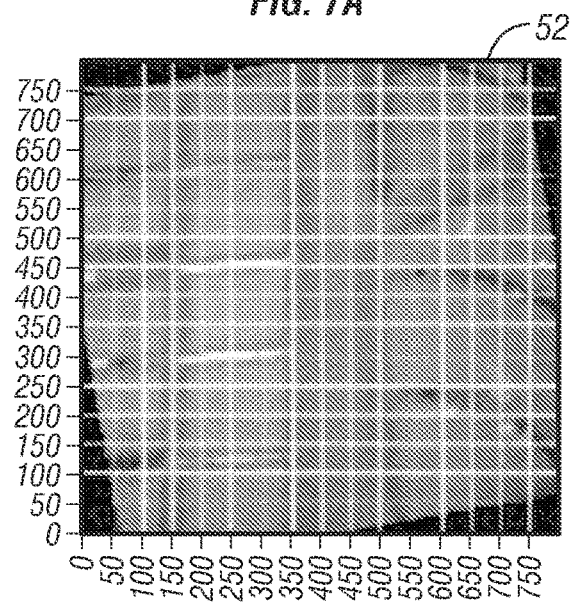
Figure 7C:
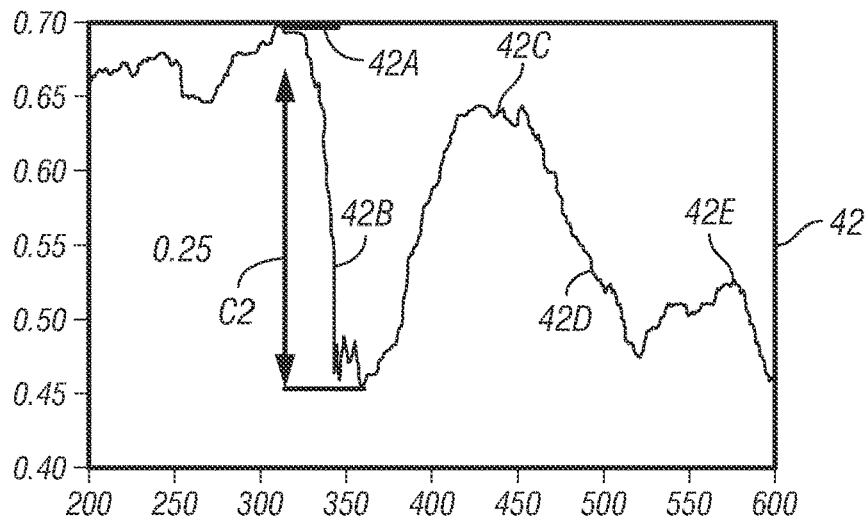

The light intensity graph 42, as shown in FIG. 7C, is generated by the processor 36 based on a gray scale image 52 of FIG. 7B generated from the captured image 58 of the tire 24 (FIG. 7A). A substantially W-shaped portion of the light intensity graph 42 corresponds to the tire tread groove 26 in the captured image 58 (FIG. 7A). The first leg 42B of the light intensity graph extends downwardly from a peak 42A because less light is reflected from the upper surface 24A of the tire on the left side of the tire tread groove 26. The peak 42A reflects the outer surface 24A of the tire to the left of the groove 26. The decrease in light intensity indicated by the leg 42B is caused by less light reflected at the inner edge of the groove 26. As the distance in the groove 26 changes from the left edge to the center of the groove 26, more light is reflected from the bottom of the groove 26, causing a peak 42C in the light intensity graph 42. The light intensity graph 42 extends downwardly from the peak 42C approaching the right edge of the groove 26, as reflected by leg 42D. The surface 24A of the tire 24 on the right side of the groove, again increases to another peak 42E on the surface 24A of the tire 24 outside the groove 26. The change C2 in light intensity is a change in the light density at the peak 42A to the light density at the bottom of the leg 42B. The amount of change C2 in the light density can be compared to stored light intensity images to estimate the tire tread depth. Based on the change C2 indicated in FIG. 7C, the tire tread depth D is estimated to be 6.82 mm (0.2685 inches).

Figure 8A:
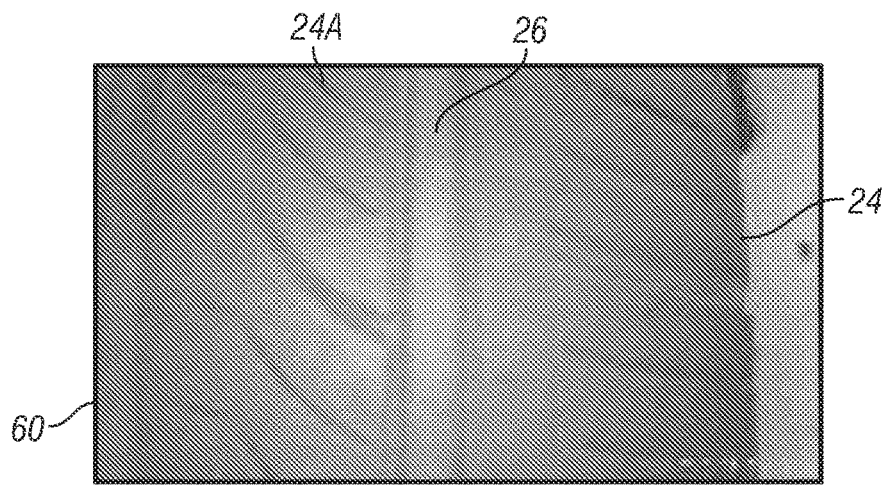
FIGS. 8A-8C are an elevational view of a tire, a corresponding gray scale image of the tire, and a corresponding image intensity of the tire for a tire tread depth of 3.5 mm.
Figure 8B:
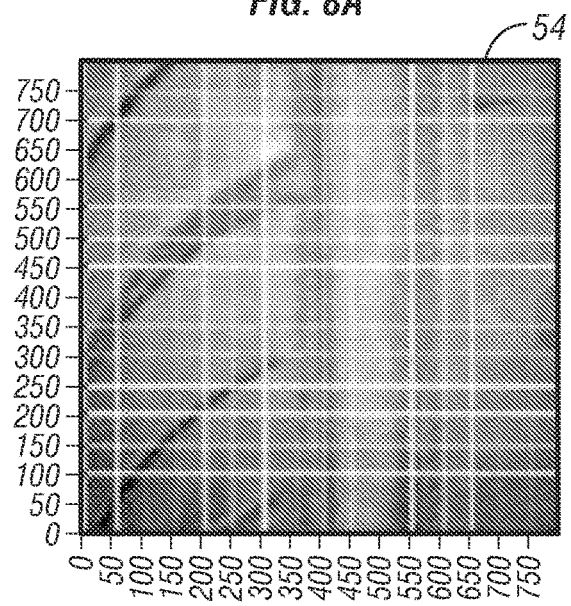
Figure 8C:
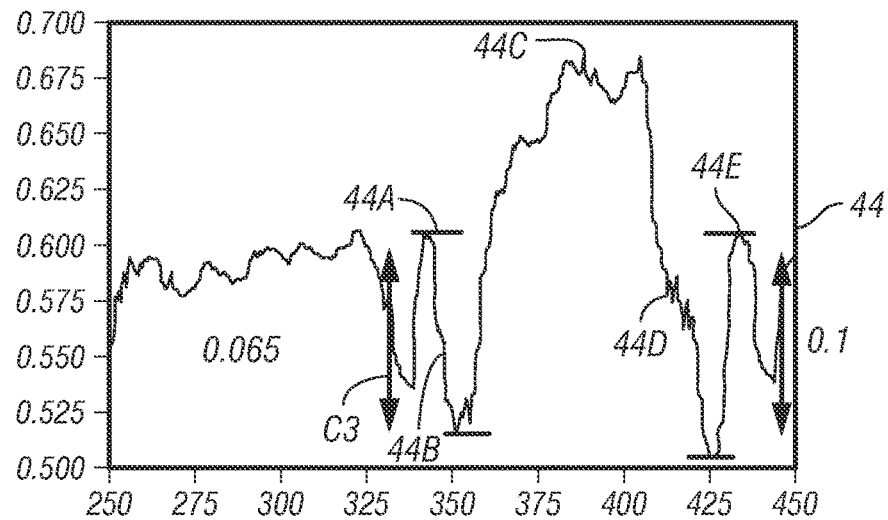

The light intensity graph 44, as shown in FIG. 8C, is generated by the processor 36 based on a gray scale image 54 of FIG. 8B generated from the captured image 60 (FIG. 8A) of the tire 24. A substantially W-shaped portion of the light intensity graph 44 corresponds to the tire tread groove 26 in the captured image 60 (FIG. 8A). The first leg 44B of the light intensity graph extends downwardly from a peak 44A because less light is reflected from the upper surface 24A of the tire on the left side of the tire tread groove 26. The peak 44A reflects the outer surface 24A of the tire to the left of the groove 26. The decrease in light intensity indicated by the leg 44B is caused by less light reflected at the inner edge of the groove 26. As the distance in the groove 26 changes from the left edge to the center of the groove 26, more light is reflected from the bottom of the groove 26, causing a peak 44C in the light intensity graph 44. The light intensity graph 44 extends downwardly from the peak 44C approaching the right edge of the groove 26, as reflected by leg 44D. The surface 24A of the tire 24 on the right side of the groove, again increases to another peak 44E on the surface 24A of the tire 24 outside the groove 26. The change C3 in light intensity is a change in the light density at the peak 44A to the light density at the bottom of the leg 44B. The amount of change C3 in the light intensity can be compared to stored light intensity images to estimate the tire tread depth D. Based on the change C3 indicated in FIG. 8C, the tire tread depth D is estimated to be 3.5 mm (0.1378 inches).

Figure 9:
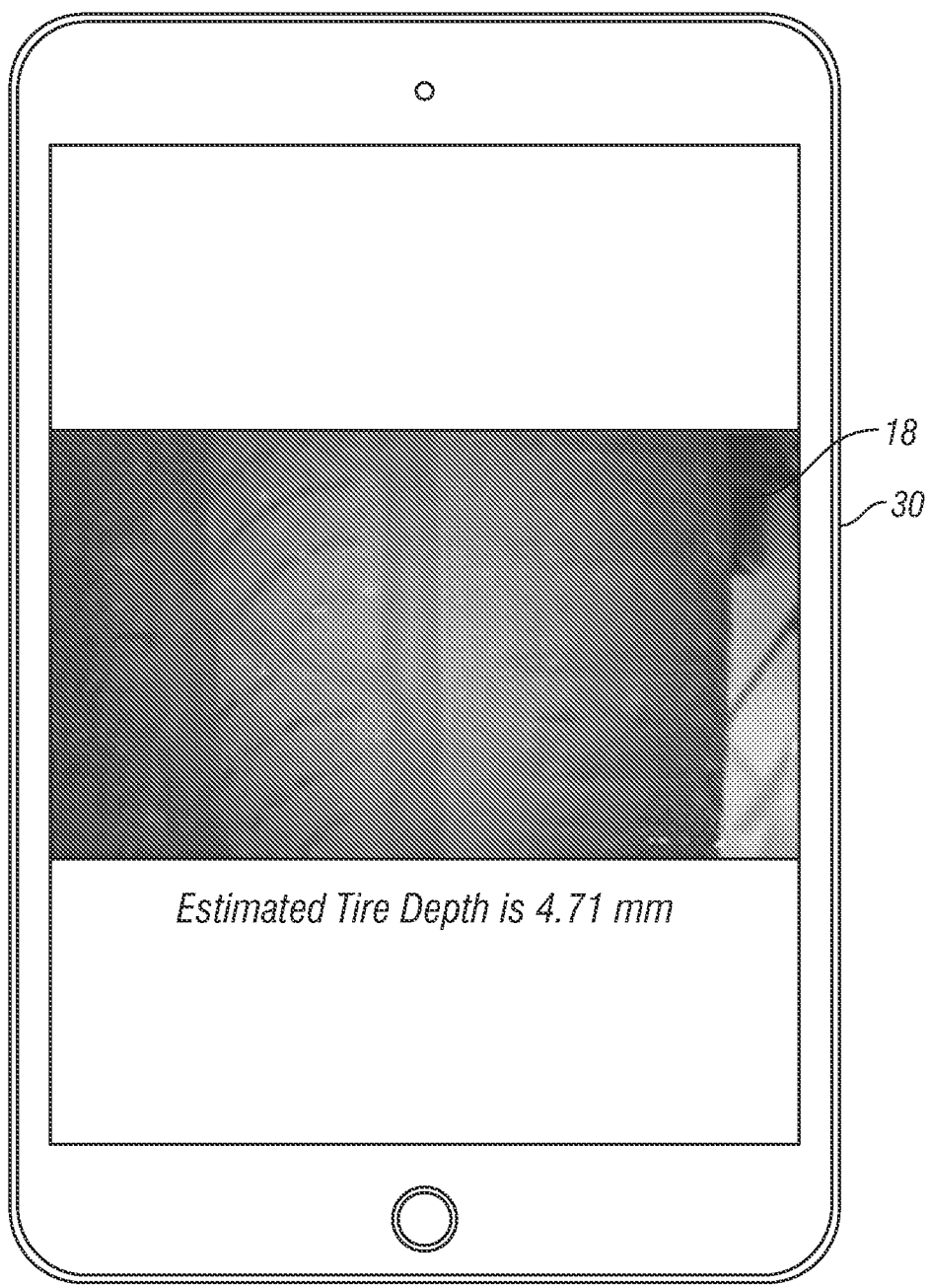
FIG. 9 is an elevational view of a mobile device displaying an estimated tire tread depth of the tire of FIG. 6A.

As shown in FIG. 9, the estimated tire tread depth D is displayed on the display 18 of the mobile device 30. In step S60, steps S10-S50 are repeated for each tire tread groove 26 of the tire 24. As shown in FIG. 4, steps S10-S50 are performed for each of the grooves 26A, 26B and 26C. The optical inspection device 14 is shifted in an axial direction of the tire 24 to image the next tire tread groove 26. Each subsequent estimated tire tread depth D can be displayed on the display 18 at the same time to provide an overview of the tire 24. In other words, a separate image is captured for each of the tire tread grooves 26A, 26B and 26C, and a plurality of images are transmitted to the electronic controller 16.

The means for determining the tire tread depth described above include software or programs that are installed onto the mobile device 30, or alternatively in the cloud C with which mobile device 30 communicates. In the illustrated embodiment, the means for determining the tire tread depth D of the groove 26 of the tire 24 includes using pre-stored light intensity graphs as reference tire tread depths for determining the tire tread depth D of the tire groove 26. The electronic controller 16 is programmed to estimate the tire tread depth based on a comparison of the generated light intensity graph of the tire groove 26 with pre-stored light intensity graphs for known tire tread depths. Any suitable method for estimating the tire tread depth based on the captured image can be used.

When the tire tread depth falls below a predetermined tire tread depth, the electronic controller 16 controls the electronic display 18 to display a tire replacement indication to the user. The storage 38 of the electronic controller 16 preferably stores the predetermined tire tread depth. The electronic controller 16 is programmed to compare the estimated tire tread depth based on the captured image to the predetermined tire tread depth to determine whether the estimated tire tread depth is equal to or less than the predetermined tire tread depth stored in the storage 38. The storage 38 can store a plurality of predetermined tire tread depths, such as a first predetermined tire tread depth (e.g., $2/32$ inches) at which tire replacement is recommended, and a second predetermined tire tread depth (e.g., $4/32$ inches) at which tire replacement is suggested.

The electronic controller 16 is programmed to determine abnormal tire wear based on a comparison of the estimated tire tread depths D for each of the grooves 26A, 26B and 26C of the tire 24. In other words, the plurality of images 56, 58 and 60 of FIGS. 6A, 7A and 8A are analyzed for a tire issue other than the tire tread depth D. For example, when the estimated center tire tread depth D of groove 26B is less than the estimated tire tread depths of the outer grooves 26A and 26C, the tire can be determined to be experiencing center wear from over inflation. When the estimated center tire tread depths D increase from the outer groove 26A toward the inner groove 26C, the tire can be determined to be experiencing toe wear, which is indicative of an alignment problem. A comparison of the estimated tire tread depths D of each of the grooves 26A, 26B and 26C by the electronic controller 16 can be used to determine a wear issue with the tire 24.

With the tire tread depth estimation system 10, the electronic controller 16 is programmed to estimate the tire tread depth D of a groove 26 of a tire 24 based on an image captured by the optical inspection device 14. Further, the electronic controller 16 is programmed to compare the image data captured by the camera 22 of the optical inspection device 14 to reference information and data to estimate the tire tread depth D.

Figure 11:
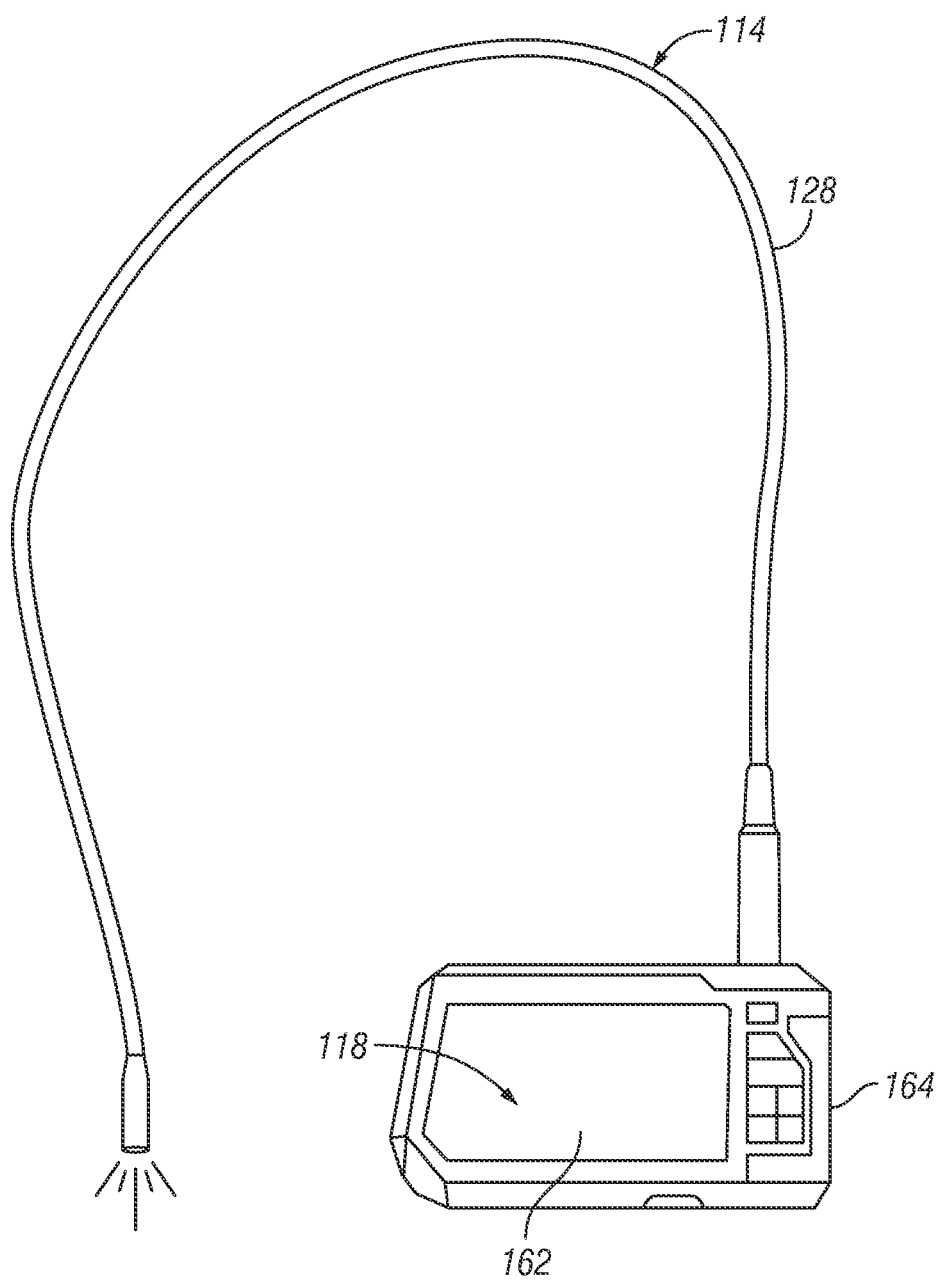
FIG. 11 is a side elevational view of an optical device of a tire tread depth estimation system in accordance with another exemplary embodiment in which a display is directly connected to an optical device.

As shown in FIG. 11, an optical inspection device 114 in accordance with another illustrated exemplary embodiment of the present invention is substantially similar to the optical inspection device 14 of the exemplary embodiment illustrated in FIGS. 1 to 10 except for the differences described below. Similar parts are identified with similar reference numerals, except increased by 100 (i.e., 1xx, accordingly).

The electronic display 118 is directly connected to the housing 128 of the optical inspection device 114. Operation of the optical inspection device 114 is controllable with the electronic display 118, either through a touch screen 162 or controls, such as buttons, disposed on a housing 164 of the electronic display 118.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle provided with the tire tread depth estimation system. Accordingly, these terms, as utilized to describe the present invention should be interpreted relative to a vehicle provided with the tire tread depth estimation system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A tire tread depth estimation system, comprising:
a light source configured to emit light onto a surface of a vehicle tire connected to a vehicle;
a camera configured to capture an image of the surface of the vehicle tire connected to the vehicle;
a housing in which the light source and the camera are disposed;
an adjustable stand supporting the housing, the adjustable stand being adjustable to adjust a position of the camera and the light source, the adjustable stand including a base and a leg movably connected to the base, the base being configured to be supported by a flat surface, the housing being connected to the leg, and the leg being movable relative to the base to adjust a position of the housing;
an electronic controller connected to the light source and to the camera, the controller being configured to estimate a depth of a tire tread of the vehicle tire based on the image received from the camera; and
a display configured to display the estimated tire tread depth.

2. The tire tread depth estimation system according to claim 1, wherein
the display being configured to display the image captured by the camera.

3. The tire tread depth estimation system according to claim 1, wherein
the stand is adjustable to control a height of the housing.

4. The tire tread depth estimation system according to claim 1, wherein
the stand is adjustable to control an angle of the housing relative to the surface of the vehicle tire.

5. The tire tread depth estimation system according to claim 1, wherein
the electronic controller being configured to estimate a depth of the tire tread of the tire based on a light intensity of the image received from the camera.

6. The tire tread depth estimation system according to claim 5, wherein
the electronic controller includes a storage that stores a plurality of light intensity graphs with respect to tire tread depths, the electronic controller being configured to estimate the tire tread depth based on the light intensity graph of the captured image and the stored light intensity graphs.

7. The tire tread depth estimation system according to claim 6, wherein
the electronic controller is to control a frequency of the light emitted by the light source.

8. The tire tread depth estimation system according to claim 1, wherein
the image captured by the camera is centered on a tire tread groove.

9. The tire tread depth estimation system according to claim 8, wherein
a separate image is captured for each tire tread groove of the vehicle tire, and a plurality of images are transmitted to the electronic controller.

10. The tire tread depth estimation system according to claim 9, wherein
the plurality of images are analyzed for a tire issue other than the depth of the tire tread.

11. A method of estimating a tire tread depth, comprising:
adjusting a position of an adjustable stand to adjust a position of a light source and a camera, the light source and the camera being disposed in a housing mounted on the adjustable stand, the adjustable stand including a base and a leg movably connected to the base, the base being configured to be supported by a flat surface, and the housing being connected to the leg;
illuminating a surface of a vehicle tire connected to a vehicle with the light source;
capturing an image of the illuminated surface of the vehicle tire connected to the vehicle with the camera;
transmitting the captured image to an electronic controller;
estimating a depth of a tire tread of the vehicle tire based on the captured image; and
displaying the estimated tire tread depth of the vehicle tire on a display;
the adjusting the position of the adjustable stand including moving the leg relative to the base to adjust the position of the light source and the camera.

12. The method of estimating a tire tread depth according to claim 11, wherein
the light source and the camera are disposed in a housing.

13. The method of estimating a tire tread depth according to claim 12, further comprising
aligning the housing such that a longitudinal axis of light emitted by the light source passes through a rotational axis of the vehicle tire.

14. The method of estimating a tire tread depth according to claim 11, further comprising
controlling a frequency of light emitted by the light source.

15. The method of estimating a tire tread depth according to claim 11, further comprising
centering the image to be captured on one tire tread groove of the vehicle tire.

16. The method of estimating a tire tread depth according to claim 15, further comprising
capturing the image for each of a plurality of tire tread grooves of the vehicle tire.

17. The method of estimating a tire tread depth according to claim 11, wherein
generating a coupon for a vehicle tire based on the estimated tire tread depth.

* * * * *